March 10, 1931.  A. Y. DODGE  1,795,845

BRAKING MECHANISM

Filed July 2, 1924   2 Sheets-Sheet 1

INVENTOR
ADIEL Y. DODGE
BY
*M. W. McConkey*
ATTORNEY

March 10, 1931. A. Y. DODGE 1,795,845
BRAKING MECHANISM
Filed July 2, 1924 2 Sheets-Sheet 2

INVENTOR
ADIEL Y. DODGE
BY
*m. w. McConkey*
ATTORNEY

Patented Mar. 10, 1931

1,795,845

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKING MECHANISM

Application filed July 2, 1924. Serial No. 723,836.

This invention relates to improvements in brake mechanisms and by way of illustration I have shown the application of my improvements as applied to the wheels of a vehicle wherein the wheel carries a drum, which is to be engaged or acted on by the brakes.

One of the difficulties encountered in the construction of internal brakes is to get the required amount of movement at the heel of the brake shoes in order that the maximum amount of brake lining surface will be brought into engagement with the drum.

Another difficulty encountered in the construction of brakes is to get an arrangement whereby the braking surface of the shoes is concentric with the drum when in engagement therewith.

It is, therefore, one of the objects of my invention to provide braking mechanism including brake shoes which will be substantially concentric with the brake drum when the brake shoes are applied to the drum and in which considerable movement of the brake shoes is secured at the heel of the brake lining.

Another object of my invention is to provide an arrangement of brake shoes such that a larger area of brake lining may be utilized.

A further object of my invention is to provide a brake mechanism which has especially good holding power for a direction of rotation of the drum reverse from the normal direction.

A further object of my invention is to provide a self-energizing or self-wrapping internal brake mechanism, whereby the power in the moving drum aids in applying the brakes.

A still further object of my invention is to provide an arrangement of brake shoes which may be operated by a double acting cam, or its equivalent, having a pivot bearing eccentric with respect to the construction of the cam per se; that is to say, the cam has a greater movement on one brake shoe than on the other, whereby each shoe receives the displacement corresponding to its requirements in order to secure contact with the drum.

These and other objects will be apparent to one skilled in this art after a study of the specification and drawings annexed hereto, in which:

Figure 4 is a side view of Fig. 3 between the lines 4/4; while

Figure 2:
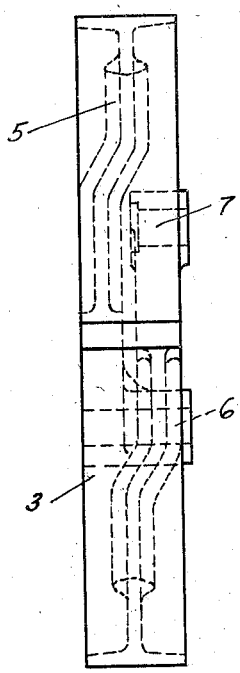
Figure 2 is a side view of Fig. 1 between the lines 2/2.
Figure 4:
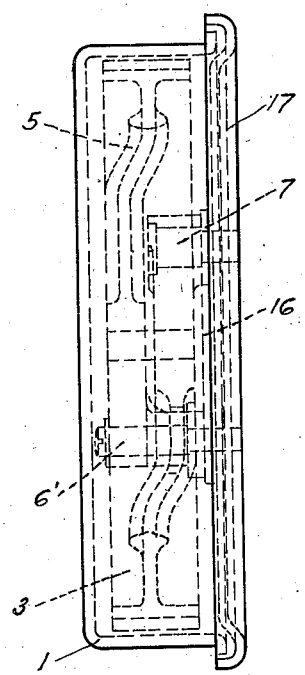

In the drawings, 1 illustrates a drum, whose direction of rotation is indicated by the arrow. Mounted internally within the drum is a brake mechanism composed of main and auxiliary brake units. The main brake unit is made up of a primary shoe 2 and a secondary shoe 3, these parts being articulated or jointed together in a floating joint 4; that is to say, the primary and secondary shoes of the main unit are not pivoted to any stationary part at 4, but the parts 2 and 3 are merely pivoted to each other. The auxiliary shoe 5 is pivoted or anchored at 6 to a stationary member. The secondary shoe of the main brake unit is pivoted or anchored to a stationary member 7 and it will be observed that the anchor points 6 and 7 overlap each other to a considerable extent, the brake shoe 3 and the auxiliary shoe 5 having portions formed or offset from each other as is indicated in Figs. 2 and 4. By thus overlapping these shoes at the pivoted points, it is possible to bring the heels of the shoes relatively close together and get a material increase in the amount of friction surface to be applied to the drum. As a matter of fact, the drawings indicate a gap distance "$d$" in the braking surface at the heels of the shoes of about 15 degrees, so that in the brake mechanism indicated, I can obtain 315 degrees or more of actual braking surface, which is well distributed around the inner periphery of the drum, there being three small gaps well separated.

A double or two-face cam 9 is placed between the free ends of the primary section 2 and the auxiliary brake shoe 5, the spring 10 being utilized to hold the primary section 2 and the shoe 5 normally in engagement with the cam 9 and out of contact with the drum. The cam 9 is arranged on its pivot or anchorage so that it turns about the point 15 which is eccentric with respect to the contour of the cam. This arrangement allows for a greater leverage to be applied to one shoe than to the other, since as illustrated, the arrangement of the brake shoes is such that in order to have all shoes come into braking engagement with the drum simultaneously and continue to produce the desired movement on the shoes, one part of the cam must operate or move farther in one direction than the other part of the cam in the opposite direction. The secondary spring 11 has one end 12 anchored to a fixed member and the other end 13 to the secondary section 3 of the main brake shoe. The position of the joint 4 is adjusted by means of an eccentric member 14, which is a very essential element in the brake combination whereby the necessary clearance can be obtained between the primary and secondary shoes and the drum. The adjustable stop member 14 may operate on the flat part of the heel of the shoe 3 or on some other portion of the articulated shoes, it being preferable however to put this adjustable stop as close to the pivot point 4 as possible, or even acting directly on the pivotal member 4. Member 14 is carried by the stationary backing plate 17 of the brake, or by a suitable other support, on the side of the shoe 3 away from the head of the brake drum 1. Shoe 3 preferably has flat surfaces, for engaging member 14, on both sides, so that the same shoe may be used either on a right or a left brake.

Figure 1:
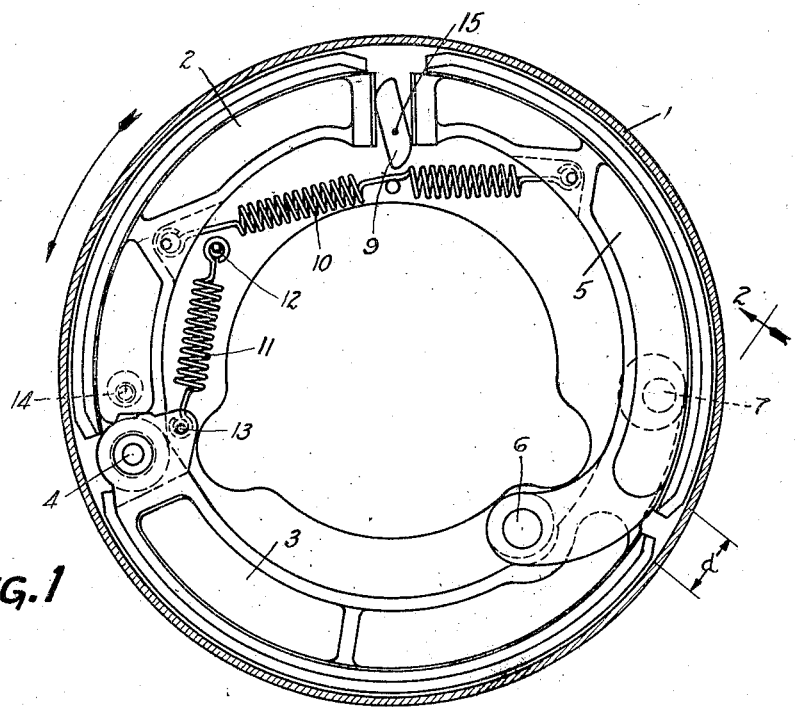
Figure 1 is a part sectional view through a wheel, whose rotation is indicated by the arrow.

It will be noted in Fig. 1 that the pivot pin 6 is set somewhat closer to the center of the brake drum than the point 7. The purpose of this will be hereinafter pointed out.

It is to be understood that the contour of all three brake shoes are eccentric to the circumference of the drum when the brake is released and concentric when the brake is applied, thus securing contact over the whole surface of the respective shoes.

Figure 3:
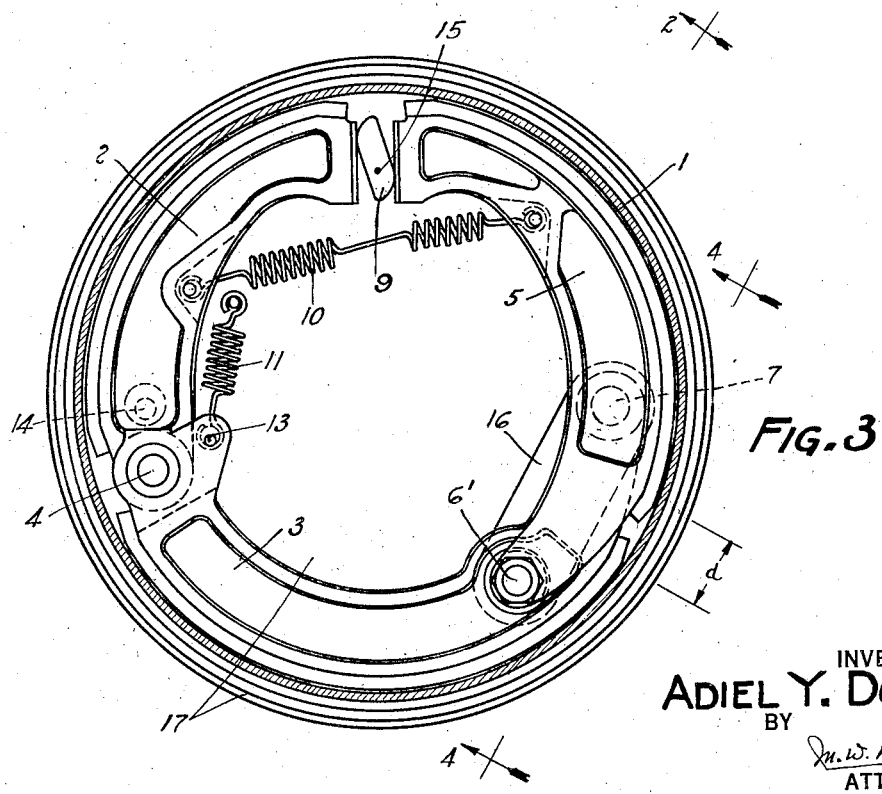
Figure 3 is a view of slightly smaller wheel than that shown in Fig. 2 and with more of the drum and cover plate indicated.

In the operation of my braking mechanism, assuming the drum to be rotating in the direction of the arrow, a rotation of the cam-shaft causes the cam 9 to separate the primary section 2 of the main shoe and the auxiliary shoe 5. The movement of the primary section 2, of course, starts movement of the secondary section 3 and the brake lining of the respective shoes engages the drum. The primary section 2 on the drum causes a self-energizing action by assisting in applying pressure to the secondary section 3 so that energy stored in the drum assists in applying the main brake shoe. At the same time that the main brake shoe is being applied, the auxiliary shoe acts in a direct manner without any self-wrapping characteristics, but in addition to its direct braking effect it assists in filling the drum and prevents deformation thereof and thus securing a better braking effect. When effort is removed from the cam, the springs 10 and 11 return the shoes to their normal position. The springs also aid in drawing the shoes over toward the backing plate where they are held snugly to prevent rattle. This is preferably true of spring 11, which is set diagonally. On reverse direction of the drum, the brakes are opened by a similar movement of the cam, but in this case the main shoe acts only as a direct brake without self-energizing characteristics, whereas the auxiliary shoe 5 becomes a self-energizing brake in that it tends to revolve with the drum and tightens against it until a balance between the pressure on the brake and friction on the drum has been reached. By setting the pivot pins or anchorage 6 on the auxiliary shoe 5 more or less closer to the center of the drum, the self-energizing feature of the shoe 5 is more or less emphasized on reverse rotation of the drum. In Figures 3 and 4 the anchor or pivot pin is shown at 6', at a radial distance greater than that of anchor 6 in Figures 1 and 2, and approximately the same as that of anchor 7. In other words almost any degree of self-energizing or holding power can be secured from the auxiliary shoe 5 by choosing the location of the anchorage 6 as above explained. However, care must be exercised to see that the pivot or anchorage 6 is so set that the auxiliary shoe 5 will not have a tendency to "grab."

It is to be noted that since the auxiliary shoe does its heavy work on reverse rotation of the drum and since in the ordinary vehicle the amount of reverse rotation is negligible as compared with the normal movement of the drum, the life of the brake lining of the auxiliary shoe will be substantially the same as that on the sections of the main shoe.

Figure 5:
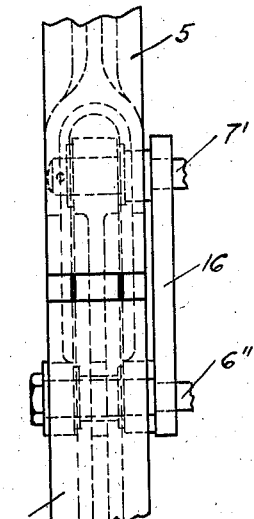
Figure 5 shows a modified form of detail with reference to the anchorage of the two parts of the brake mechanism.
Figure 6:
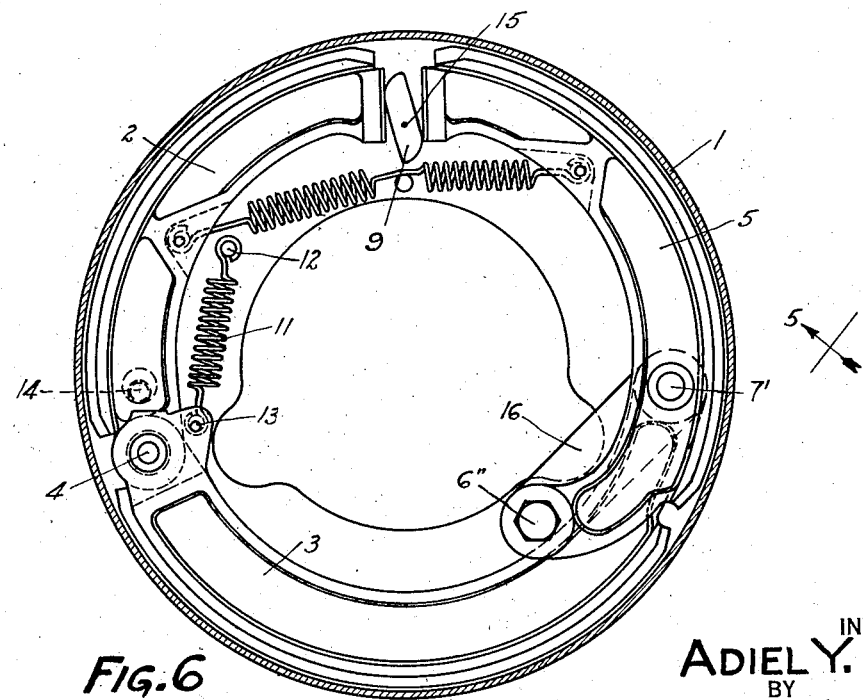
Figure 6 is a view corresponding to Figure 1, but showing the brake of Figure 5.

It is to be understood that where the pivot pin 6 for the auxiliary shoe 5, passes through the shoe 3, that sufficient clearance is provided around the pivot or anchorage 6 so that the movement of shoe 3 will not be interfered with. In order to strengthen the assembly, the two anchors or pivot pins 7 and 6 (or 6', Figures 3 and 4, or 6'', Figures 5 and 6) may be connected by a reinforcing plate or bar 16. Furthermore, it will be readily appreciated that numerous changes may be made in the detail arrangements, for example, in Figures 5 and 6, the auxiliary shoe 5 has a portion bifurcated to straddle the end of the secondary shoe 3, the two shoes thus being arranged with their respective pivots 7 and 6'' each between the ends of the friction face of the other shoe, instead of being superimposed as in Figures 2 and 4.

It is, therefore, to be understood that I do not wish to be limited, except as limited by the scope of the appended claims.

Having thus described my invention, what I claim is:

1. In brake mechanism for engaging a rotatable drum, a brake member approximately 240° in length having self energizing characteristics and an independent member approximately 120° in length giving direct action for the normal direction of the drum and means for moving both type of members into engagement with the drum, said members acting with reverse characteristics on reverse rotation of the drum, said independent member having its anchor point appreciably nearer the centre of the drum whereby on reverse rotation of the drum the self energizing feature is emphasized in the independent member.

2. A brake comprising, in combination, a shoe having spaced-apart parallel strengthening webs at least at its end, an adjacent shoe having one end straddled by the parallel webs of the first shoe, means for anchoring each of the shoes between the ends of the other and for anchoring one of them nearer the center of its arc than the other, and means for applying the two shoes.

3. A brake comprising a pair of shoes, one of which is substantially T-shaped in section throughout and the other of which is channel-shaped in section at least at its end and is arranged to straddle the end of the first shoe, together with pivots for the overlapped ends of the shoes, at least one of which pivots passes through both shoes.

4. A brake comprising a pair of shoes, the first of which has a generally central strengthening web at its end, and the other of which has a pair of spaced strengthening webs at its end straddling the end of the central web, and an anchor for the end of the central web passing through relatively large openings in the spaced webs.

5. A brake comprising a pair of shoes, the first of which has a generally central strengthening web at its end, and the other of which has a pair of spaced strengthening webs at its end straddling the end of the central web, and an anchor for the end of the spaced webs passing through a relatively large opening in the central web.

6. A brake comprising a plurality of shoes extending substantially a complete circumference and each of which is substantially less than 180° in length, and at least two of which shoes overlap each other a considerable distance at their ends, in combination with anchors for said overlapped ends at different distances from the circumference.

7. A brake comprising a plurality of shoes extending substantially a complete circumference and each of which is substantially less than 180° in length, and two of which shoes are anchored at different distances from the circumference and overlap each other a considerable distance at their anchored ends, in combination with anchors for said ends one of which passes through an opening in the other shoe.

8. A brake comprising a pair of shoes, a backing plate, an anchor for each shoe carried by the backing plate between the ends of the other shoe, and a separate reinforcing plate connecting the anchors and secured to the backing plate by the anchors.

9. A brake comprising, in combination, a drum, a pair of shoes having anchors at their adjacent ends within the drum and one of which anchors is further radially from the drum than the other, and means for applying the brake including an unanchored shoe acting on at least one of the anchored shoes.

10. A brake comprising, in combination, a drum, a pair of shoes having anchors at their adjacent ends within the drum and one of which anchors is further radially from the drum than the other, and means for applying the brake including an unanchored shoe pivotally connected to one of the anchored shoes.

11. A brake having a backing plate and two anchors, and provided with a reinforcing member secured to the backing plate by said two anchors.

In testimony whereof, I affix my signature.

ADIEL Y. DODGE.